United States Patent
Escudero et al.

(10) Patent No.: US 10,834,610 B2
(45) Date of Patent: Nov. 10, 2020

(54) MANAGING LTE NETWORK CAPACITY

(71) Applicant: T-Mobile USA, Inc., Bellevue, WA (US)

(72) Inventors: Otto Fonseca Escudero, Bellevue, WA (US); Gary Dousson, Seattle, WA (US); Marie Grace Jacinto, Bellevue, WA (US); Khrum Kashan Jat, Sammamish, WA (US); Jatinder Singh Sandhu, New Castle, WA (US)

(73) Assignee: T-Mobile USA, Inc., Bellevue, MA (US)

( * ) Notice: Subject to any disclaimer, the term of this patent is extended or adjusted under 35 U.S.C. 154(b) by 0 days.

(21) Appl. No.: 16/272,868

(22) Filed: Feb. 11, 2019

(65) Prior Publication Data
US 2020/0260295 A1    Aug. 13, 2020

(51) Int. Cl.
*H04W 16/22*    (2009.01)
*H04W 24/10*    (2009.01)
(Continued)

(52) U.S. Cl.
CPC .......... *H04W 16/22* (2013.01); *H04B 17/309* (2015.01); *H04B 17/391* (2015.01);
(Continued)

(58) Field of Classification Search
CPC ..... H04W 16/22; H04W 24/10; H04W 24/08; H04W 28/0268; H04W 24/00; H04B 3/46;
(Continued)

(56) References Cited

U.S. PATENT DOCUMENTS 7,668,109 B2 *   2/2010   Veres ................. H04W 24/08
                                                                370/252
9,167,442 B2 *   10/2015  Uelk ..................... H04L 43/16
(Continued)

FOREIGN PATENT DOCUMENTS

WO   WO 2018/103524 A1   6/2018

OTHER PUBLICATIONS

International Search Report and Written Opinion in International Application No. PCT/US2020/017545 dated May 4, 2020, in 17 pages.

*Primary Examiner* — Sharad Rampuria
(74) *Attorney, Agent, or Firm* — Knobbe, Martens Olson & Bear LLP (57) ABSTRACT

Systems and methods are described for monitoring performance and allocating resources to improve the performance of a wireless telecommunications network. A wireless telecommunications network may be comprised of base stations and other infrastructure equipment, which may be sourced from various suppliers. Users may generate traffic on the wireless network, and performance metrics relating to the user experience may be collected from individual base stations. The set of available metrics for a particular base station may vary according to the supplier. A machine learning model is thus trained using metrics from multiple base stations, and used to estimate values for metrics that a particular base station does not provide. The metrics are then further characterized according to the service classes of the users, and resources for improving the performance of base stations are allocated according to the reported and estimated metrics for various service classes.

24 Claims, 5 Drawing Sheets

(51) Int. Cl.
*H04B 17/309* (2015.01)
*H04W 28/02* (2009.01)
*H04B 17/391* (2015.01)
*H04W 24/08* (2009.01)

(52) U.S. Cl.
CPC .......... *H04W 24/08* (2013.01); *H04W 24/10* (2013.01); *H04W 28/0268* (2013.01)

(58) Field of Classification Search
CPC .... H04B 17/00; H04B 17/309; H04B 17/391; H04L 43/00; H04L 43/50
See application file for complete search history.

(56) References Cited

U.S. PATENT DOCUMENTS 9,432,865 B1 *  8/2016  Jadunandan .......... H04W 24/08
9,967,753 B1     5/2018  Jadunandan et al.
10,477,426 B1 * 11/2019  Tiwari .................. H04W 16/18

* cited by examiner

MANAGING LTE NETWORK CAPACITY

BACKGROUND

Generally described, computing devices can be used to exchange information via a network. Mobile computing devices may utilize a network provided by a wireless service provider to facilitate the exchange of information in accordance with one or more wireless communication protocols. For example, a wireless service provider may maintain a wireless network that enables mobile computing devices to exchange information in accordance with a fourth-generation wireless telecommunications protocol, such as the Long Term Evolution ("LTE") protocol. The wireless network may be comprised of individual network components, such as base stations ("cells") that transmit and receive radio signals within a particular geographic area. The wireless service provider may manage the performance of the wireless network by collecting metrics from base stations and other network components.

A wireless service provider may obtain base stations and other network components from various manufacturers. The network components may collect and report performance metrics in accordance with industry protocols and standards, and, depending on the manufacturer, may collect and report additional metrics.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to wireless telecommunications. More specifically, aspects of the present disclosure are directed to systems, methods, and computer-readable media related to managing the performance of wireless telecommunications networks. Illustratively, a wireless service provider may facilitate communications between a first party who uses a mobile computing device (which may also be referred to herein as a "user device" or "user equipment") and a second party or parties, who may use mobile computing devices, telecommunications devices, or other computing devices. The wireless service provider may facilitate these communications by providing a wireless telecommunications network, which may include various infrastructure equipment. The wireless telecommunications network may implement one or more wireless air interface protocols, such as LTE, by facilitating transmission and receipt of data between the user device, the infrastructure equipment, and the other party or parties to the communication session.

The wireless service provider may monitor performance of its network by collecting various service measurements and relating them to the performance of various network elements. For example, the wireless service provider may collect service measurements from individual base stations that indicate the strength and quality of radio signals received by user devices. Service measurements, which are also referred to herein as "performance metrics" or simply "metrics," may be defined by or based upon the implemented wireless protocols. For example, the LTE protocol defines a Channel Quality Indicator ("CQI"), which measures the quality of communications between user equipment and a base station. The CQI may be measured and reported by user equipment, and the base station may receive the CQI reports, aggregate them, and generate a metric such as average CQI over a specified time period. Service measurements may also be generated based on network conditions, capacity, bandwidth, or other factors. For example, a base station may generate a "Network Load" metric that measures the quantity of data transmitted per 5 MHz of radio spectrum.

The wireless service provider may implement one or more aspects of its wireless network using components from various manufacturers. These components may implement standard wireless protocols, such as LTE, and may thus be combined into a single wireless network. The wireless protocols may specify metrics that the network components must provide in order to implement the protocol. The network components may also provide additional metrics, which may vary from one manufacturer to the next. For example, base stations from a first manufacturer may report a metric such as "number of data sessions per hour whose average throughput was below a specified threshold," and base stations from a different, second manufacturer may not report this metric. These inconsistencies may make it difficult for the wireless service provider to consistently measure performance across the entire network, and may prevent the wireless service provider from relying on metrics that are not always available. Further, even in the case where a base station reports a broader set of metrics, the metrics alone may not provide sufficient information to enable the wireless service provider to assess network performance from a customer perspective. For example, the wireless network provider may allow customers to subscribe to different classes of service, which may be associated with different guarantees or expectations (e.g., a target data throughput rate). The base station may only report aggregate metrics for all mobile devices connected to that particular infrastructure equipment and may not distinguish metrics for different subscriber service levels. Accordingly, the wireless service provider may be unable to characterize performance by service class and identify performance issues that affect a particular service class. As a further example, the metrics reported by the base stations may not be directly relevant to user perceptions of network quality, especially when data-centric protocols such as LTE are implemented. For example, the reported metrics may include an average data throughput for all data sessions on a particular base station within a specified time period. The metric may indicate that, on average, data throughputs were at an acceptable level (e.g., 5 Mbps on average). However, the metric may disguise a problem in which a majority of customers experience data sessions with unacceptable throughput rates (e.g., 1 Mbps) while a small minority experience exceptional throughput rates (e.g., 50 Mbps).

To address one or more performance issues of the wireless telecommunications network, the wireless service provider may therefore implement a user experience metrics service as described herein. In one aspect, the user experience metrics service may generate additional or alternative user experience metrics for infrastructure equipment that does not provide particular user experience metrics. In other aspects, the user experience metrics service may analyze collected or generated user experience metrics to identify potential areas for improvement and prioritize allocation of resources. As used herein, "user experience metrics" may generally refer to metrics that capture information regarding performance of a wireless telecommunications network from the perspective of an end user of the network. For example, a user experience metric may indicate whether a user's data session throughput is at or above a rate that allows the user to stream video content without lag. As a further example, a user experience metric may indicate that average call audio quality is above a threshold. In some embodiments, the wireless service provider may define user experience metrics in terms of network performance objectives or quality of service guarantees.

In some embodiments, the user experience metrics service may use a machine learning model to generate, estimate, or otherwise characterize values for user experience metrics that a base station does not provide. For example, a machine learning model may be used to determine a "low data throughput" metric, which may indicate, for a specified base station and time period, the number (or percentage) of data sessions that had an average throughput below a threshold. Illustratively, the machine learning model may be trained using data from base stations that are configured to provide a low data throughput metric (in addition to other metrics), and may adjust the machine learning model to account for relationships between the other metrics (e.g., a network load metric and a CQI metric) and the "low data throughput" metric. For example, the machine learning model may correlate the "low data throughput" metric to the network load metric, and inversely correlate the low data throughput metric to the CQI metric. The machine learning model may thus be trained to generate values for a "low data throughput" metric based on the values of the other metrics for the specified base station and time period. In some embodiments, the user experience metrics service may use the output of the machine learning model to generate additional user experience metrics. For example, the user experience metrics service may use a machine learning model to determine a "low data throughput" metric as described above. The user experience metrics service may then obtain or estimate a total number of data sessions for the base station and time period, and calculate a "percentage of users experiencing low data throughput" metric by using the "low data throughput" estimate as a numerator and the total number of data sessions as a denominator.

The user experience metrics service may, in some embodiments, collect additional metrics from other sources. For example, the user experience metrics service may obtain a log file or other information relating to application-specific data usage. The log file may identify data sessions associated with a particular application that executes on mobile computing devices, such as a streaming audio or video application, a social media application, a chat application (which may also involve streaming audio or video), a messaging application, an email application, a game, and so forth. The log file may further identify particular users who initiated the data sessions, and may include information such as times and durations of the data sessions, quantities of data transferred, and the base station or stations that took part in the data transfers. As a further example, in some embodiments, the user experience metrics service may obtain information regarding service classes from a subscriber database or other source of service class information. In other embodiments, service class information may be obtained from the base station as part of the performance metrics.

Illustratively, the user experience metrics service may use the information collected from other sources and the metrics generated by the machine learning model to supplement, validate, or replace the metrics collected from wireless network infrastructure equipment. For example, the user experience metrics service may analyze the performance metrics from the base stations, the application data usage information, and other sources of information to determine or estimate, for example, the number of users in a particular service class who experienced low data throughput at a particular base station and time period. The user experience metrics service may further analyze the user experience metrics associated with individual base stations to prioritize allocation of resources to the base stations. For example, the user experience metrics service may determine that a first cell site has a low average load, a high average CQI, and a low number or percentage of data sessions with low throughput. The user experience metrics service may further determine that a second cell site has a higher average load, a lower average CQI, and a greater number or percentage of data sessions with low throughput. The user experience metrics service may thus prioritize allocation of engineering resources to the second cell site to improve the user experience at the site. By prioritizing the allocation of resources to cell sites having lower user experience metrics, the user experience metrics service may increase the efficiency of resource allocation and cause a greater improvement to network performance that would otherwise have occurred.

Although described herein with reference to one or more wireless air interface standards, such as the LTE wireless air interface standards, it will be understood that the present disclosure is not limited to any particular wireless air interface standards. It will further be understood that example embodiments described herein may refer to specific metrics collected in accordance with a wireless air interface. Such examples and embodiments are provided solely for purposes of clarity of illustration and do not indicate that the embodiments of the present disclosure are limited to such particular examples, collected metrics, or air interface standards.

It will be understood that the user experience metrics service described herein addresses a specific technical problem that arises in the realm of computer networks, and in particular addresses a problem that arises in the realm of wireless networks. It will further be understood that the technical problem described herein is not analogous to any pre-Internet practice, and that the user experience metrics service improves the performance of a wireless network by allocating performance improvement resources more efficiently. By implementing the user experience metrics service, a wireless service provider may thus improve the performance of the provider's wireless network and provide wireless telecommunications services more efficiently.

Embodiments of the disclosure will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
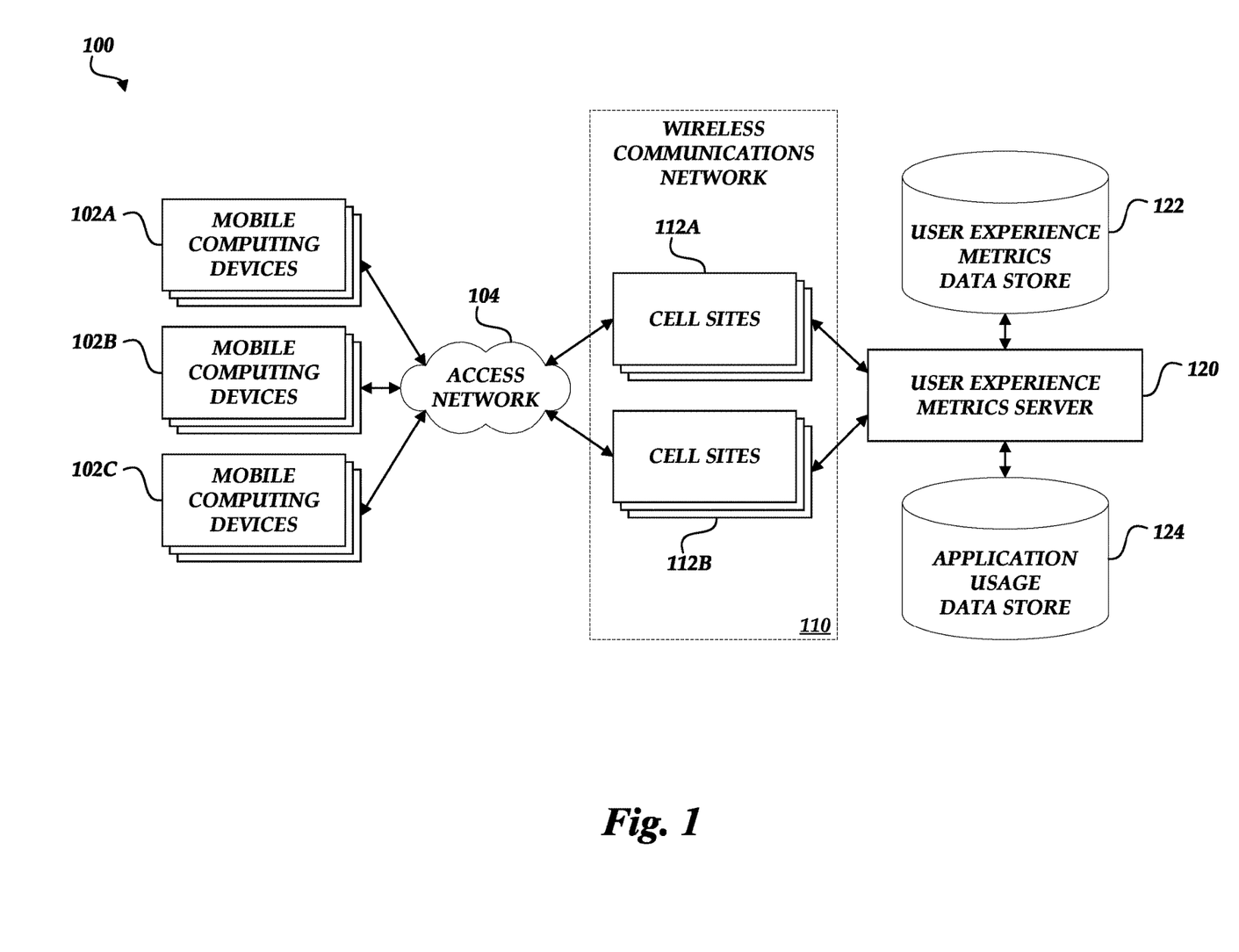
FIG. 1 is a block diagram of an example network environment for implementing a user experience metrics service in accordance with aspects of the present disclosure.

With reference now to FIG. 1, an embodiment of an illustrative network topology 100 will be described. It will be understood that the network topology 100 may include more (or fewer) components than those depicted in FIG. 1, and that illustration of the additional components is not necessary to provide an enabling disclosure. The illustrated network topology 100 includes mobile computing devices 102A-C (which may also be referred to herein as "user equipment") that communicates via an access network 104 with a wireless network infrastructure 110 including cell sites 112A-B. The cell sites 112A-B (or, in some embodiments, other components of the wireless network infrastructure 110) further communicate with a user experience metrics server 120, which in turn communicates with a user experience metrics data store 122 and an application usage data store 124.

The mobile computing devices 102A-C may generally be any computing devices that communicate with cell sites 112A-B via the access network 104. It will be understood that the term "mobile computing device" is used for purposes of illustration, and that the present disclosure is not limited to devices that are mobile. For example, devices that communicate with cell sites 112A-B via the access network 104 may include laptops, personal computers, tablet computers, personal digital assistants ("PDAs"), hybrid PDA/ mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

In some embodiments, mobile computing devices 102A may be associated with a first service class, mobile computing devices 102B may be associated with a second service class, and mobile computing devices 102C may be associated with a third service class. Service classes may be associated with various targets or priorities with regard to network performance. In some embodiments, for example, mobile computing devices 102A may be associated with a service class that specifies a minimum data throughput rate, and mobile computing devices 102B may be associated with a service class that does not specify a minimum throughput rate. In some embodiments, service classes may be associated with users of mobile computing devices 102A-C, and may thus be independent of any characteristic or attribute of particular mobile computing devices 102A-C. In other embodiments, service classes may be associated with a device attribute or characteristic, and thus the mobile computing devices 102A may have distinct attributes or characteristics relative to the mobile computing devices 102B or 102C. In addition, although FIG. 1 depicts mobile computing devices 102A, 102B, and 102C associated with three service classes, it will be understood that the present disclosure is not limited to any particular number of service classes.

In some embodiments, the wireless service provider may prioritize allocation of network engineering resources, equipment, bandwidth, radio spectrum, or other resources according to the service classes of affected mobile computing devices 102A-C. For example, the wireless service provider may assign a high priority to improving the performance of cell sites 112A, where mobile computing devices 102A are receiving less than the target data throughput rate for their service class. The wireless service provider may then assign a lower priority to improving the performance of cell sites 112B, where mobile computing devices 102B are receiving low throughput rates but mobile computing devices 102A are receiving acceptable rates. The wireless service provider may then schedule, budget, reserve, or otherwise allocate resources to the respective cell sites in accordance with the determined priorities. In some embodiments, the wireless network provider may prioritize delivery of services, such as high-speed data throughput, to mobile computing devices 102A-C based on their service classes. For example, the wireless network provider may cause a cell site 112A to reserve bandwidth for users in a first service class, and may only allow users in a second service class to use whatever bandwidth remains. In other embodiments, the wireless service provider may deliver services without regard to a device's service class, but may prioritize network improvements (e.g., allocating additional equipment or spectrum) according to how the improvements affect a particular service class or classes. In some embodiments, the service classes may be characterized according to one or more categories such as price points (e.g., "gold" and "silver" service classes), contractual relationships (e.g., "prepaid" and "post-paid"), categories of users (e.g., "business" and "consumer"), or other distinctions. The wireless service provider may associate these categories with different service guarantees or performance targets, and may prioritize and manage network resources accordingly.

The access network 104 may generally be any network that enables communication between the mobile computing devices 102A-C and the cell sites 112A-B. In some embodiments, the access network 104, mobile computing devices 102A-C, and the cell sites 112A-B may collectively implement an Enhanced UMTS Terrestrial Radio Access Network ("E-UTRAN") in accordance with the LTE specification. In other embodiments, the access network 104 (separately or in combination with other components depicted in FIG. 1) may implement a different wireless telecommunications protocol.

The network topology 100 further includes a wireless network infrastructure 110, which may include cell sites 112A-B, trunk lines, switching machines, network gateways, mobile computing devices, and other hardware and software components for providing wireless telecommunications services. In some embodiments, the user experience metrics server 120, user experience metrics data store 122, and/or the application usage data store 124 may be components of the wireless network infrastructure 110. The wireless network infrastructure 110 may broadcast signals on various bands of the wireless spectrum, and may implement protocols such as LTE, GPRS, CDMA, GSM, or other wireless protocols in order to provide wireless services.

The cell sites 112A-B may provide wireless network services in specified geographic regions. Illustratively, each of the cell sites 112A and each of the cell sites 112B may be associated with a different geographic region. In some embodiments, the cell sites 112A may collect and report a first set of metrics, and the cell sites 112B may collect report a second, different set of metrics. For example, a cell site 112A may collect a first metric, a second metric, and a third metric, and a cell site 112B may collect the first metric, the third metric, and a fourth metric. It will be understood that each cell site 112A-B may report different values for the collected metrics. For example, the first metric may be a count of the total number of data sessions that took place at the cell site 112A-B within a specified time period. It will further be understood that, in various embodiments, the metrics collected from the cell sites 112A-B may relate to different mobile computing devices 102A-C, or may relate to the same mobile computing device 102A-C as it travels to different geographic regions of the wireless network. The metrics collected by the cell sites 112A may be a subset of the metrics collected by the cell sites 112B, or may be metrics that are related but not directly comparable. For example, cell sites 112A may report an "average data throughput" metric, while cell sites 112B may report a "number of data sessions with throughput below 1.5 Mbps" metric. In various embodiments, cell sites 112A and 112B be sourced from different manufacturers, include different software or hardware, be configured with different hardware or software configurations, execute different software versions, experience throttling or other reporting limitations, or include other differences that cause them to report different sets of metrics.

The metrics reported by the cell sites 112A-B may be obtained by a user experience metrics server 120, which is described in more detail below with reference to FIG. 5. In some embodiments, as depicted in FIG. 1, the cell sites 112A-B may communicate directly with the user experience metrics server 120. In other embodiments (not depicted in FIG. 1), the cell sites 112A-B may communicate with the user experience metrics server 120 indirectly. For example, the user experience metrics server 120 may communicate with the cell sites 112A-B via a private network, personal area network ("PAN"), LAN, WAN, cable network, satellite network, wireless network, the Internet, any other medium of computer data transfer, or some combination thereof. In some embodiments, the cell sites 112A-B may report metrics to another component of the wireless network infrastructure 110, and the user experience metrics server 120 may obtain the metrics from the other component.

The user experience metrics server 120 may store the metrics it obtains from the cell sites 112A-B (and, in some embodiments, may store metrics that it generates or estimates) in a user experience metrics data store 122. The user experience metrics server 120 may communicate with the user experience metrics data store 122 directly or indirectly as described above. The user experience metrics data store 122 may generally be any non-transitory computer-readable medium, including but not limited to a magnetic medium (e.g., a hard disk drive), optical medium, solid state device, flash drive, and the like. In some embodiments, the user experience metrics data store 122 may be implemented as a database, database server, or other server. In various embodiments, the user experience metrics data store 122 may be implemented as a single data store or multiple data stores. In further embodiments, the user experience metrics data store 122 may be implemented as component(s) of the user experience metrics server 120.

The user experience metrics server 120 may similarly communicate with an application usage data store 124, which may generally be any non-transitory computer-readable medium as described above. The application usage data store 124 may store information regarding data sessions initiated via one or more applications executing on the mobile computing devices 102A-C. For example, the application usage data store 124 may store information regarding streaming audio sessions, streaming video sessions, chat sessions, messaging sessions, email sessions, game sessions, and so forth. In some embodiments, the application usage data store 124 may store information that enables the user experience metrics server 120 to determine a mobile computing device 102A-C, associated with the data session, a data throughput rate for all or part of the data session, and the individual cell sites 112A-C associated with all or part of the data session. In some embodiments, the application usage data store 124 and the user experience metrics data store 122 may be implemented as a single data store, and either or both may be implemented as component(s) of the user experience metrics server 120.

Figure 2:
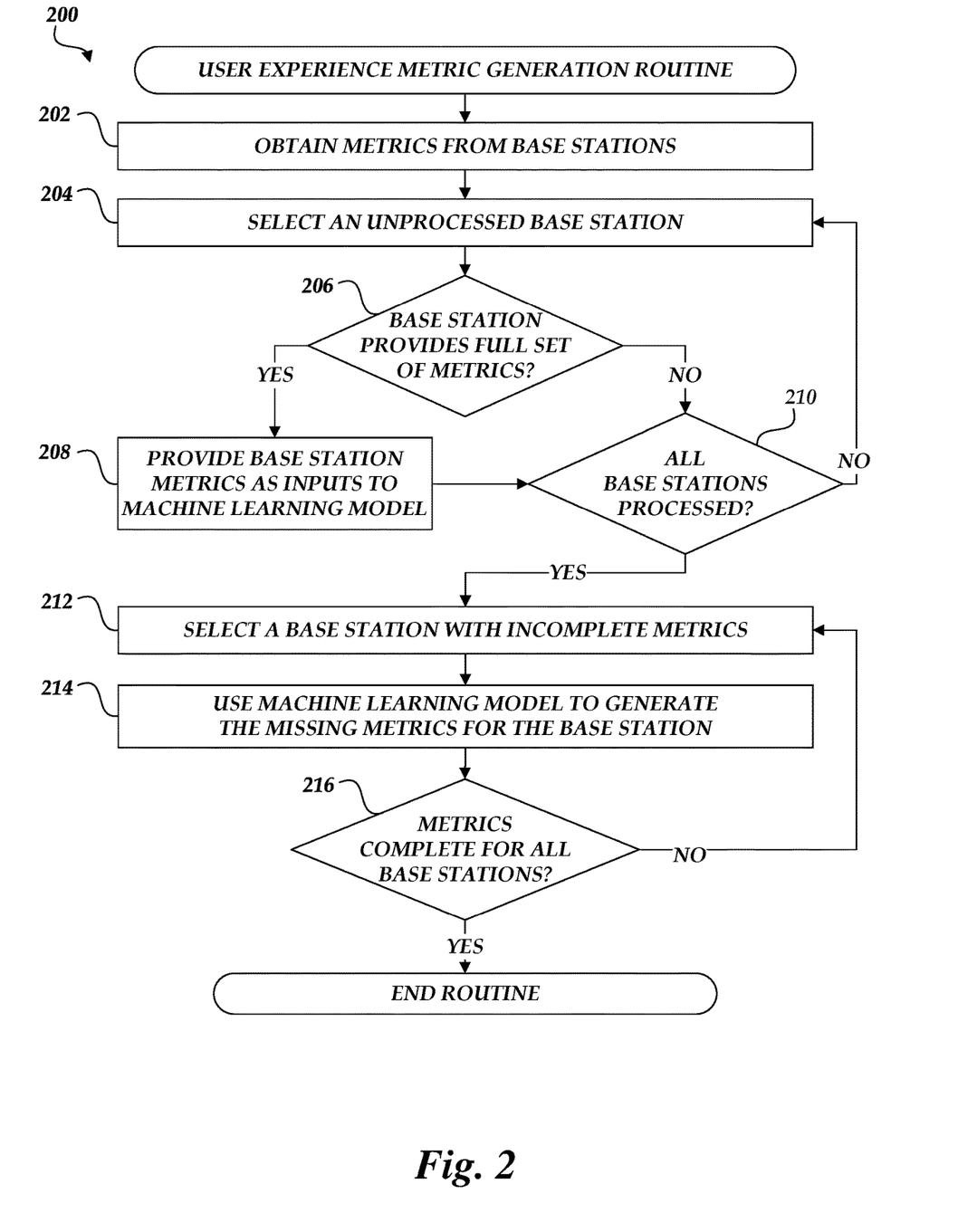
FIG. 2 is a flow diagram depicting an example user experience metric generation routine that is illustratively implemented in the network environment of FIG. 1.

With reference now to FIG. 2, a flow diagram of an example user experience metric generation routine 200 will be described. The routine 200 may be carried out, for example, by the user experience metrics server 120 of FIG. 1. The routine 200 begins at block 202, where metrics may be obtained from various base stations. As described above, metrics may be obtained directly from individual base stations, or from another network component that collects and forwards base station metrics. In some embodiments, the metrics may be associated with a particular time period, such as an hour of a particular day (e.g., 4:00 p.m. to 4:59 p.m. PDT on Jun. 2, 2018). At block 204, a base station that has not yet been processed by blocks 206-210 of the routine 200 may be selected.

At decision block 206, a determination may be made as to whether the selected base station has provided a complete set of metrics of interest. It will be understood that a set of metrics may be "complete" in the sense that the base station has provided all of the metrics that it is configured to provide, but may be incomplete in that one or more metrics that are of interest to the wireless service provider (e.g., metrics that the service provider uses to characterize user experience) are not provided. In some embodiments, the determination may be made based on whether a particular metric has been provided. For example, a desired metric may measure a quantity of data sessions that had an average throughput rate below a specified threshold within a particular time period, and the determination may be that the base station does not provide the desired metric. In other embodiments, the determination may be made based on a cell site type, manufacturer, software version, or by comparing the metrics obtained from the cell site to metrics obtained from other cell sites. It will further be understood that a set of metrics may be "complete" relative to one or more metrics that are used to characterize user experience, and that a set may be incomplete with regard to other measurements and still be complete for purposes of the routine 200.

If the determination at decision block 206 is that a complete set of metrics for the base station has been obtained, then at block 208, in some embodiments, the metrics may be used as training input for a machine learning model. For example, the set of metrics may include metrics A, B, and C, which may have values 17.4, 4, and 9.6 respectively. The set of metrics may thus be used to train the machine learning model that a target output value for metric A is 17.4 when the input value for metric B is 4 and the input value for metric C is 9.6. By providing sets of metrics from several cell sites, the machine learning model may thus be trained to characterize the value for individual metrics based on the values of other metrics. In some embodiments, a machine learning model may be trained on metrics from base stations that have particular characteristics. For example, a machine learning model may be trained on metrics from base stations located within a particular geographic region. As a further example, a machine learning model may be trained on base stations having certain characteristics, such as base stations whose transmit power is within a particular range (e.g., 5-10 watts). In further embodiments, a machine learning model may incorporate the time at which the metrics were collected as an input. For example, the machine learning model may be trained to favor metrics that were collected more recently. Other variations and models are within the scope of the present disclosure.

After block 208 has been carried out, or if the determination at decision block 206 is that the base station did not provide a complete set of metrics, the routine 200 proceeds to decision block 210, where a determination may be made as to whether all of the base stations for which metrics were obtained at block 202 have been processed by blocks 206-210. If not, then the routine 200 branches to block 204, where another unprocessed base station is selected. The routine 200 then iterates until all of the base stations have been processed, at which point the routine 200 branches to block 212. In some embodiments, blocks 202-210 may be carried out as a separate routine, and the machine learning model may be trained on currently or previously collected metrics prior to the execution of the rest of the routine 200. In other embodiments, blocks 210 and 212 may be omitted and the machine learning model may be trained and used simultaneously rather than sequentially.

At block 212, a base station with incomplete metrics (e.g., a base station for which the determination at decision block 206 was that its metrics were not complete) may be selected. At block 214, the machine learning model may be used to determine an estimated value for the missing metric(s) of interest. For example, the incomplete set of metrics may include metrics B and C, which may have values of 2.2 and 9 respectively. These metrics may be provided as inputs to the machine learning model, which may provide an output of 14.1 as an estimated value for the missing metric A. In some embodiments, a base station with complete metrics may be selected at block 212, and one or more of the metrics reported by the base station may be validated at block 214 by comparing the obtained value for the metric to a value determined by the machine learning model.

At decision block 216, a determination may be made as to whether all incomplete sets of metrics have been completed. If not, then the routine 200 branches to block 212, where another base station with incomplete metrics is selected, and the routine 200 then iterates until all of the base stations have a complete set of metrics. The routine 200 then ends.

It will be understood that FIG. 2 is provided for purposes of illustration, and that many variations on the example routine 200 are within the scope of the present disclosure. For example, the blocks of the routine 200 may be carried in other orders and combinations not depicted in FIG. 2, some of which are discussed above. As a further example, a variation of the routine 200 may be carried out in which a set of metrics is obtained from an individual base station, and the set of metrics is then completed or used to train the machine learning model. The example routine 200 is thus understood to be illustrative and not limiting.

Figure 3:
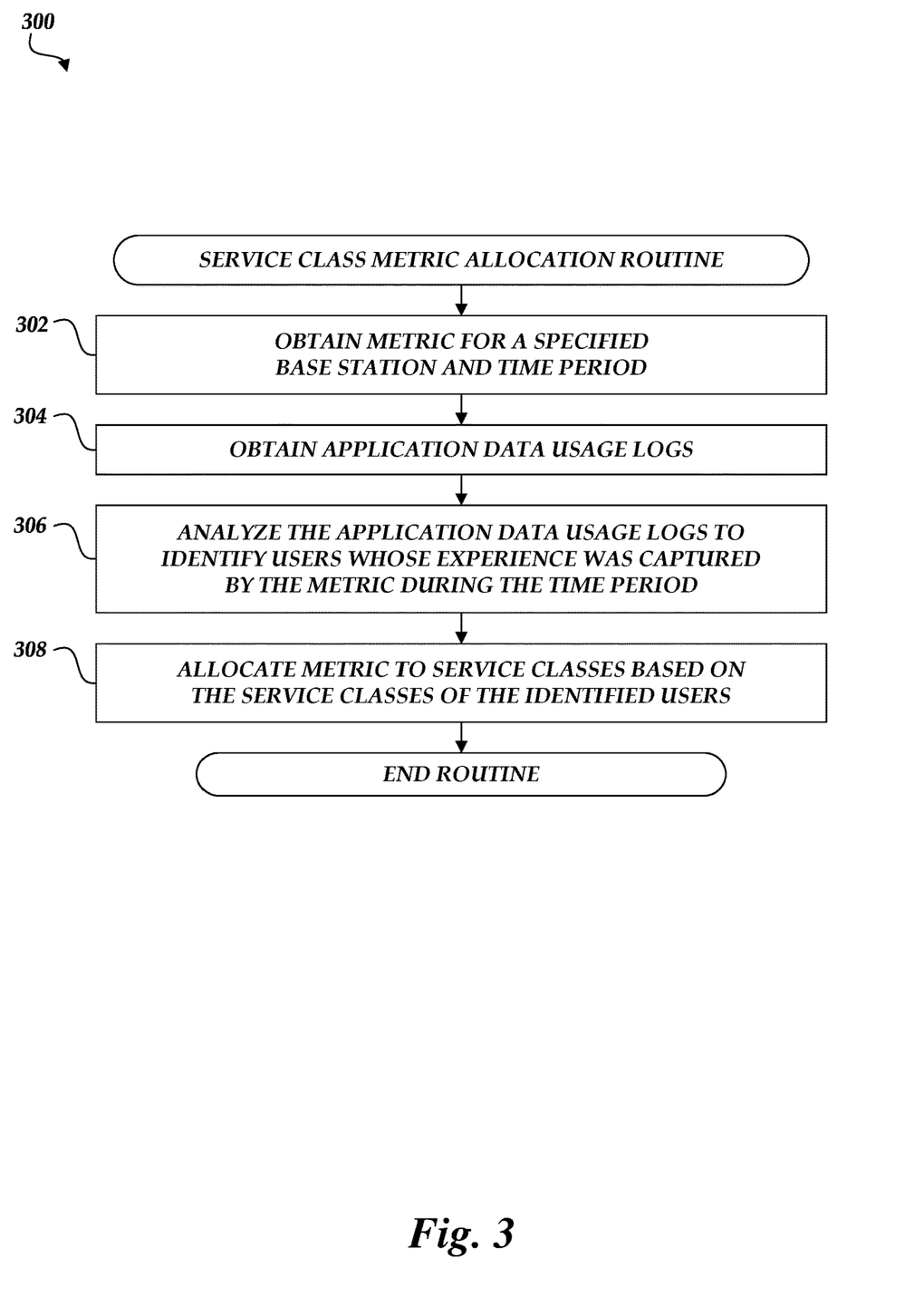
FIG. 3 is a flow diagram depicting an example service class metric allocation routine that is illustratively implemented in the network environment of FIG. 1.

FIG. 3 depicts a flow diagram of an example service class metric allocation routine 300, which may be carried out, for example, by the user experience metrics server 120 of FIG. 1. The routine 300 begins at block 302, where a metric may be obtained for a specified base station and time period. For example, a "low data throughput" metric may be obtained. The "low data throughput" metric may indicate, for example, that 18 users experienced average data throughput below 1.8 Mbps at cell site #201 between 2:00 p.m. and 3:00 p.m. on a specified day. It will be understood that the "low data throughput" metric is disclosed for purposes of illustration, and that the present disclosure is not limited to any particular metric.

At block 304, application data usage logs may be obtained. As described above, the application data usage logs may contain information regarding data sessions associated with a particular application. For example, an application data usage log may contain information regarding usage of a streaming audio application during a particular time period and at a particular cell site. The log may indicate, for example, that user A listened to streaming audio for 10 minutes during the time period associated with the metric, user B listened to streaming audio for 35 minutes, and user C listened to streaming audio for 60 minutes during a particular hour. The log may further indicate that, during the same time period, user A received 4.3 gigabytes of streaming audio data via cell site #201, user B received 26.9 gigabytes, and user C received 69.1 gigabytes.

At block 306, the application data usage logs may be analyzed to identify individual users whose user experience was captured by the metric obtained at block 302. Continuing the previous example, individual users who experienced a data throughput below 1.8 Mbps may be identified from the application data logs. For example, the logs may be analyzed to determine that user A's average data throughput while listening to streaming audio was 0.9 Mbps, user B's average throughput was 1.6 Mbps, and user C's average throughput was 2.4 Mbps. It may thus be determined that users A and B were among the 18 users who were identified by the "low data throughput" metric as experiencing data throughput below 1.8 Mbps. In some embodiments, application data usage logs from multiple applications may be obtained and analyzed to obtain a larger sample of the user population. In other embodiments, logs may be obtained that are not application-specific, and that identify the total amount of data sent or received by all users of the cell site during the time period. In other embodiments, logs may be obtained that capture only data that is sent, only data that is received, or both.

At block 308, the metric obtained at block 302 may be allocated to various service classes based on the service classes of the individual users identified at block 306. To continue the above example, user A may be in the "gold" service class, user B may be in the "silver" service class, and user C may be in the "bronze" service class. Since users A and B were identified as experiencing low data throughput, and since user C was not, the 18 users identified by the "low data throughput" metric may be allocated as follows: nine "gold" service class members, nine "silver" service class members, and zero "bronze" service class members. In some embodiments, percentages may be determined (e.g., that 15% of "gold" service class members are experiencing low data throughput) based on other information obtained from metrics or logs.

It will be understood that the users identified at block 306 need not include all of the users identified by the metric obtained at block 302. Rather, the service classes of the users identified by the metric are estimated based on the distribution of users within the application data usage logs. In some embodiments, the distribution of users in the application data usage logs may be used without identifying particular users who contributed to the metric. For example, the application data usage logs may be used to determine that 28% of the users of a particular cell site during a particular time window were in the "gold" service class, 34% were in the "silver" service class, and 38% were in the "bronze" service class. The 18 users who experienced low data throughput may thus be allocated proportionally. Other approaches to analyzing and allocating the users based on application data usage logs are within the scope of the present disclosure. For example, in some embodiments, the routine 300 may allocate a metric across multiple sets of categories, such as a set of service class categories as described above, a set of mobile device categories (e.g., mobile devices from different manufacturers), a set of data plan categories, and so forth. The 18 users who experienced low data throughput may thus be categorized in a number of ways. For example, two users who both experienced low data throughput may both be in the "gold" service class, but one user may have a mobile device from manufacturer X while the other has a mobile device from manufacturer Y. The routine 300 may thus identify various categories of users that are particularly affected by the condition indicated by the metric.

Figure 4:
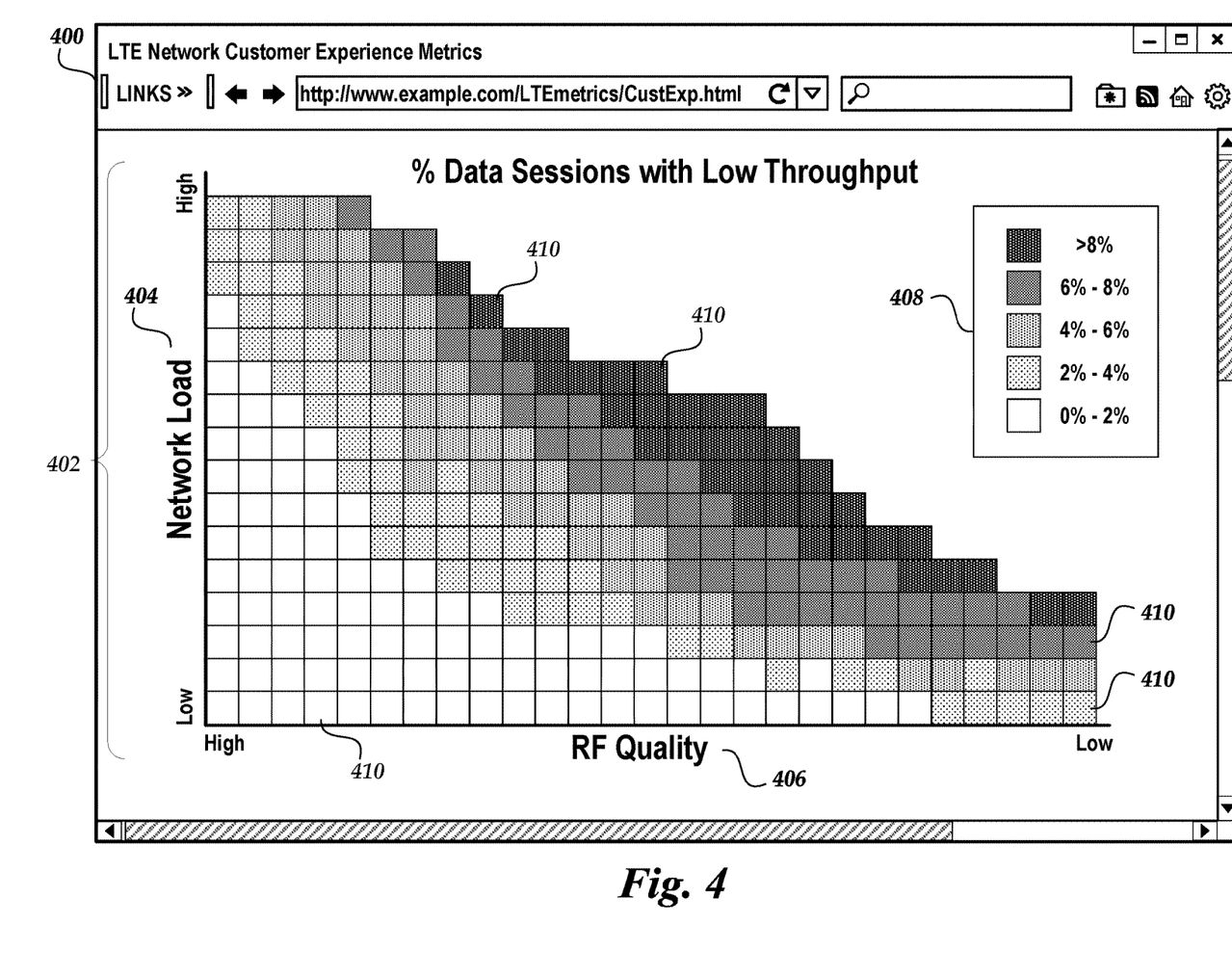
FIG. 4 is a pictorial diagram of an example user interface for displaying generated and prioritized user experience metrics in accordance with aspects of the present disclosure.

FIG. 4 is a pictorial diagram of an example user interface 400 for displaying and visualizing user experience metrics in accordance with aspects of the present disclosure. In the illustrated embodiment, the user interface 400 includes a graph 402, which displays metrics that were obtained or generated as described above. The displayed metrics include a network load metric 404, which forms the Y-axis of the graph, an RF quality metric 406, which forms the X-axis, and a "percent data sessions with low throughput" metric, which is indicated by a coloring or shading of individual data points 410 on the graph. The individual data points 410 may correspond to cell sites for which measurements have been obtained or generated. For example, an individual data point 410 may indicate that a particular cell site has a low network load (e.g., that the available bandwidth of the site is not being fully utilized), a low RF quality (e.g., the radio signals that mobile devices receive from the cell site are of poor quality), and that a relatively high percentage of data sessions at the site have a low throughput. The site may thus be visually identified as a candidate for prioritized allocation of resources. The user interface 400 may further include a legend 408, which indicates the relationship between various colors or shades and corresponding ranges for the value of the low data throughput metric.

It will be understood that FIG. 4 is provided for purposes of illustration, and that many variations on how the generated user experience metrics are displayed are within the scope of the present disclosure. For example, the user experience metrics may be presented as part of a prioritized list of cell sites. As a further example, the graph 402 may display information regarding data throughput or RF quality for a particular service class. As a still further example, the data points 410 may be selectable, such that selection of a data point 410 causes additional information to be displayed regarding the corresponding cell site or the user experience metrics. FIG. 4 is thus understood to be illustrative and not limiting.

Figure 5:
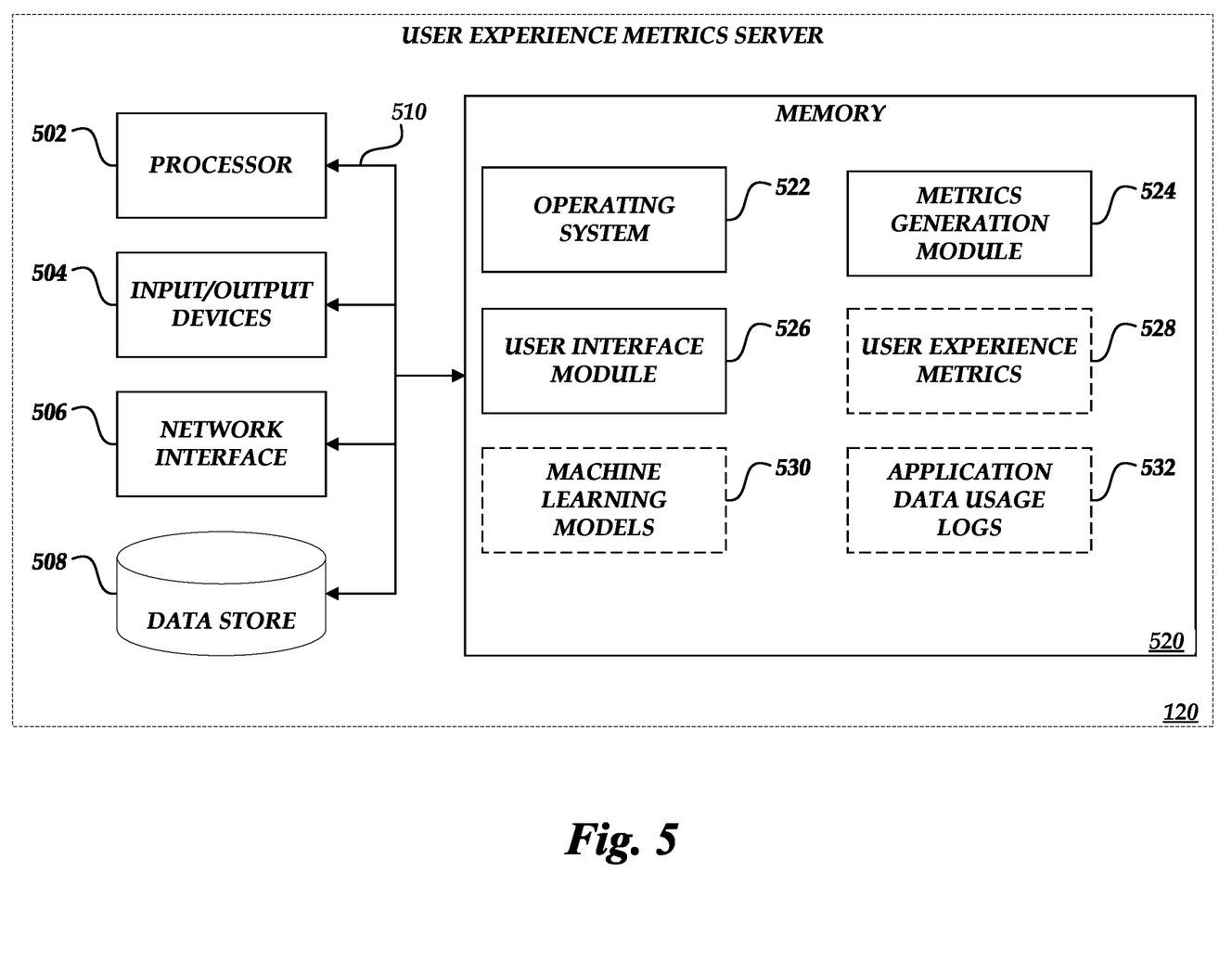
FIG. 5 is a functional block diagram of an example computing device for implementing a user experience metrics service in the network environment of FIG. 1.

FIG. 5 is a functional block diagram of an example user experience metrics server 120 that may implement aspects of the present disclosure. The user experience metrics server 120 can be a server or other computing device, and can comprise a processing unit 502, optional input/output devices 504, a network interface 506, a data store 508, and a memory 520. The network interface 506 can provide connectivity to one or more networks or computing systems. The processing unit 502 can receive information and instructions from other computing systems or services via the network interface 506. The network interface 506 can also store data to memory 520, either directly or via a bus interface 510. The processing unit 502 can communicate to and from memory 520 and output information to the input/output devices 504 via the bus interface 510. The processing unit 502 can also accept input from the input/output devices 504, which may include devices such as a keyboard, mouse, digital pen, microphone, camera, touchscreen, etc.

The memory 520 contains computer program instructions that the processing unit 502 executes in order to implement one or more embodiments. The memory 520 generally includes RAM, ROM, and/or other persistent, non-transitory computer readable media. The memory 520 can store an operating system 522 that provides computer program instructions for use by the processing unit 502 or other elements included in the computing device in the general administration and operation of the user experience metrics server 120. The memory 520 can further include computer program instructions and other information for implementing aspects of the present disclosure. For example, in one embodiment, the memory 520 includes a metrics generation module 524 that implements aspects of the present disclosure. The metrics generation module 524 may illustratively carry out all or some of the illustrative routines depicted in FIGS. 2 and 3.

The memory 520 may further contain a user interface module 526, which may implement one or more aspects of the present disclosure. For example, in one embodiment, the user interface module 526 may implement the example user interface depicted in FIG. 4. The memory 520 may further include user experience metrics 528, a machine learning model or models 530, and application data usage logs 532. In some embodiments, the user experience metrics 528, machine learning model(s) 530, and application data usage logs 532 may be loaded into the memory 520 from a data store, such as the data store 508, the user experience metrics data store 122 of FIG. 1, or the application usage data store 124 of FIG. 1. In further embodiments, as described above, all or part of the user experience metrics 528 may be generated by the metrics generation module 524.

The elements included in the user experience metrics server 120 may be coupled by a bus 510. The bus 510 may be a data bus, communication bus, or other bus mechanism to enable the various components of the user experience metrics server 120 to exchange information. In some embodiments, the user experience metrics server 120 may include additional or fewer components than are shown in FIG. 5. For example, the user experience metrics server 120 may include more than one processing unit 502 and data store 508. In another example, the user experience metrics server 120 may not be coupled to input/output devices 504. In still another example, the user experience metrics server 120 may include various interdependent or independent subcomponents implementing different aspects of the present disclosure. In some embodiments, two or more user experience metrics servers 120 may together form a computer system for executing features of the present disclosure.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A computer-implemented method comprising:
obtaining a set of metrics collected by a first base station of a plurality of base stations, wherein the set of metrics includes a first metric and a second metric, wherein the first base station does not collect a third metric that is collected by at least one other base station of the plurality of base stations, and wherein the set of metrics is associated with a time period;
calculating, based at least in part on the first metric, the second metric, and a machine learning model trained with metrics collected by the plurality of base stations, the third metric for the first base station during the time period, wherein the third metric quantifies user experiences of low data throughput;
obtaining application data usage information for a plurality of users;
identifying, based at least in part on the application data usage information, a first subset of the plurality of users, wherein the application data usage information indicates that individual users in the first subset experienced low data throughput at the first base station during the time period, and wherein the individual users in the first subset are associated with a first service class;
determining, based at least in part on a size of the first subset, an estimated value of the third metric for the first service class;
generating for display a user interface, the user interface including information regarding a percentage of users in the first service class who experienced low data throughput at the first base station during the time period; and
displaying the user interface on a client computing device.

2. The computer-implemented method of claim 1, wherein the third metric comprises a number of user data sessions having a throughput lower than a threshold rate.

3. The computer-implemented method of claim 2, wherein identifying the first subset of the plurality of users comprises identifying individual users for whom the application data usage information indicates a data session throughput lower than the threshold rate.

4. The computer-implemented method of claim 1, wherein the first metric comprises a channel quality indicator, and wherein the second metric comprises a network load.

5. A system comprising:
a data store configured to store computer-executable instructions; and
a processor in communication with the data store, wherein the computer-executable instructions, when executed by the processor, configure the processor to:
obtain a set of metrics collected by a first base station, wherein the set of metrics includes a first metric and a second metric, and wherein the set of metrics does not include a third metric that is collected by at least one other base station;
calculate, based at least in part on the set of metrics collected by the first base station and a machine learning model trained with user experience metrics, an estimated value for the third metric;
associate a first subset of a plurality of users with the third metric based at least in part on application data usage information for the plurality of users, wherein individual users in the first subset are associated with a first service class; and
transmit information regarding the first subset of the plurality of users to a client computing device.

6. The system of claim 5, wherein the first subset of the plurality of users comprises users in the first service class who are associated with the third metric.

7. The system of claim 5, wherein the processor is further configured to determine a percentage of users in the first service class who are associated with the third metric.

8. The system of claim 5, wherein the processor is further configured to associate a second subset of the plurality of users with the third metric based at least in part on the application data usage information, wherein individual users in the second subset are associated with a second service class.

9. The system of claim 5, wherein the set of metrics is a first set of metrics, and wherein the processor is further configured to:
obtain a second set of metrics from a second base station, the second set of metrics from the second base station including the first, second, and third metrics; and
determine a priority for allocating resources to the first base station and the second base station based at least in part on the first set of metrics, the second set of metrics, the third metric calculated for the first base station, and the third metric obtained from the second base station.

10. The system of claim 9, wherein the priority is determined based at least in part on a size of the first subset of the plurality of users.

11. The system of claim 5, wherein the application data usage information is associated with an application that executes on mobile computing devices.

12. The system of claim 11, wherein the application is associated with at least one of streaming audio, streaming video, social media, chat, messaging, email, or gaming.

13. The system of claim 5, wherein the processor is further configured to:
obtain a second set of metrics from a plurality of base stations; and
train the machine learning model using a first portion of the second set of metrics as input and a second portion of the second set of metrics as target output.

14. The system of claim 13, wherein the second set of metrics is associated with a service class of a plurality of service classes.

15. The system of claim 5, wherein the third metric indicates a percentage of users who experienced data session throughputs below a threshold rate, and wherein the processor is further configured to determine, for individual service classes of a plurality of service classes, an estimated number of users in the service class who experienced data session throughputs below the threshold rate.

16. The system of claim 5, wherein the information transmitted to the client computing device includes instructions for displaying a user interface.

17. The system of claim 16, wherein the user interface comprises a graph that displays the first and second metrics as axes.

18. The system of claim 17, wherein the user interface displays individual base stations as points on the graph.

19. The system of claim 18, wherein the user interface displays the third metric as a color or shade of the points.

20. A non-transient computer-readable storage medium storing computer-executable instructions that, when executed by a processor, configure the processor to:
obtain one or more metrics collected by a first base station;
calculate, based at least in part on the one or more metrics and a machine learning model, an additional metric, wherein the additional metric is not collected by the first base station, and wherein the additional metric is collected by at least one other base station;
associate, based at least in part on application data usage information, at least a portion of the additional metric with a first service class of a plurality of service classes; and
transmit information regarding the portion of the additional metric that is associated with the first service class.

21. The non-transient computer-readable storage medium of claim 20, wherein the processor is further configured to determine, based at least in part on the at least a portion of the additional metric associated with the first service class, a priority for allocating resources to the first base station.

22. The non-transient computer-readable storage medium of claim 20, wherein the processor is further configured to obtain one or more metrics associated with a second base station.

23. The non-transient computer-readable storage medium of claim 22, wherein the one or more metrics associated with the second base station include the additional metric.

24. The non-transient computer-readable storage medium of claim 20, wherein the first service class is associated with a minimum data throughput.

* * * * *